United States Patent [19]

Freedman et al.

[11] Patent Number: 4,924,386

[45] Date of Patent: May 8, 1990

[54] METHODS AND APPARATUS FOR EFFICIENT RESOURCE ALLOCATION

[75] Inventors: Barry A. Freedman, Lincroft; Marc S. Meketon, Middletown; Robert J. Vanderbei, Morganville, all of N.J.

[73] Assignee: American Telephone and Telegraph Company, New York, N.Y.

[21] Appl. No.: 72,943

[22] Filed: Jul. 13, 1987

[51] Int. Cl.$^5$ .............................................. G06F 15/20
[52] U.S. Cl. .................................. 364/402; 379/113; 379/221
[58] Field of Search ................. 364/402; 379/113, 221; 340/825.28

[56] References Cited

U.S. PATENT DOCUMENTS

| 4,345,116 | 8/1982 | Ash et al. | 379/221 |
| 4,669,113 | 5/1987 | Ash et al. | 379/221 |
| 4,704,724 | 11/1987 | Krishnan et al. | 379/221 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |

OTHER PUBLICATIONS

"A New Polynomial-Time Algorithm for Linear Programming", *Combinatorica*, vol. 4, N. Karmarkar, 1984, pp. 373-395.

"An Extension of Karmarkar's Algorithm for Linear Programming Using Dual Variables", Technical Report No. 648, Cornell University College of Engineering, Todd et al., Jan. 1985.

"Efficient Implementation of a Class of Preconditioned Conjugate Gradient Methods", SIAM J. Sci. Stat. Comput., vol. 2, No. 1, S. C. Eisenstat, Mar. 1981.

"Some Computational Experience and a Modification of the Karmarkar Algorithm", ISME Working Paper 8-105, Pennsylvania State University, Cavalier et al., Feb. 1985.

"A Variation on Karmarkar's Algorithm for Solving Linear Programming Problems", IBM T. J. Watson Research Center, Earl R. Barnes.

"On Projected Newton Barrier Methods for Linear Programming and an Equivalence to Karmarkar's Projective Method", Technical Report SOL 85-11, Systems Optimization Laboratory, Stanford University, Gill et al., Jul. 1985.

*Primary Examiner*—Allen MacDonald
*Attorney, Agent, or Firm*—Henry T. Brendzel

[57] ABSTRACT

A method and apparatus for optimizing resource allocations is disclosed which utilizes the Karmarkar algorithm to proceed in the interior of the solution space polytope. The values of the allocation variables are limited by upper and lower bounds, either individually or collectively with the same common bound. Each successive approximation of the solution point, and the polytope, are normalized such that the solution point is at the center of the normalized polytope using a diagonal matrix of the current solution point. The objective function is then projected into the normalized space and the next step is taken in the interior of the polytope, in the direction of steepest-descent of the objective function gradient and of such a magnitude as to remain within the interior of the polytope. The process is repeated until the optimum solution is closely approximated.

The resulting algorithm steps are advantageously applied to linear programming problems which involve allocations which are simultaneously dependent on a large number of constraints, problems which might otherwise involve excessive amounts of computation time.

6 Claims, 6 Drawing Sheets

KARMARKAR ALGORITHM
(PRIOR ART)

50

KARMAKAR ALGORITHM

FINITE UPPER BOUND ALGORITHM

FINITE UPPER AND LOWER BOUND ALGORITHM

GENERALIZED UPPER BOUND ALGORITHM

METHODS AND APPARATUS FOR EFFICIENT RESOURCE ALLOCATION

TECHNICAL FIELD

This invention relates to systems for using the Karmarkar algorithm for resource allocation among a plurality of resource utilizers, and, more particularly, to the use of partitioning techniques to permit the use of finite upper and lower bounds on the value of the allocations, thereby to extend the Karmarkar algorithm to a larger class of real world problems.

BACKGROUND OF THE INVENTION

The need for resource allocation decisions arises in a broad range of technological and industrial areas such as the assignment of transmission facilities in telephone transmission systems, the control of the product mix of a factory, the deployment of industrial equipment, inventory control, and others. Resource allocation in this context means, in general, the deployment of specific technological or industrial resources for the production of particular technological or industrial results.

Resource allocation decisions are typically subject to constraints on such allocations. Resources are always limited in overall availability, and, furthermore, the usefulness of a particular resource in some particular application may also be limited. For example, the traffic-carrying capacity of each individual link in a telecommunications system is limited, while the overall traffic offered to the communications system is also limited. Each particular allocation of resources can be associated with a "payoff," i.e., a cost of that allocation or an allocation benefit (e.g., profit). The problem, then, is to allocate the resources so as to satisfy all of the constraints and, simultaneously, to maximize the payoff, i.e., minimize the costs or maximize the benefits.

One method of representing such allocation decision problems is called the linear programming model. Such a model consists of a number of linear expressions that represent the quantitative relationships among allocations, constraints and payoffs. An expression is said to be linear if it is the sum of constant coefficients multiplied by unknown allocation values. Many resource allocation problems, of course, cannot be represented by such linear expressions, but involve higher powers of the unknowns or other nonlinearities in the relationships and hence are not susceptible to linear programming approaches.

It should be noted that the resource allocation problems discussed above are real physical problems arising in real physical systems. While it is true that significant quantitative aspects of the physical problem can be represented by the linear programming model, the purpose of this model is to provide optimum values which are then used in the physical world to construct or operate a physical system. Linear programming models are typically used to design telephone systems, to schedule airline activities or to control petro-chemical processes.

The feasible solutions to linear programming problems are often modeled as a multidimensional geometric shape—a polyhedron with a surface made up of thousands of multisided planes or "polygons" based on the constraints of the problem. This polyhedron, which is technically termed a "polytope," is an organized representation of the problem's constraints.

To find an optimum solution from among the many feasible solutions of a linear programming problem, an algorithm or procedure is applied. Such procedures follow an imaginary line or path from point to point in or on the surface of the polytope. The points on this path are steps in a series of interim solutions to the problem. Each such step is called an iteration. Each step or iteration, in turn, consists of the processing of equations that consider many interrelated constraints and variables.

It has long been known that the optimum solution to any linear programming problem must lie at one of the corners or vertices of the polytope. Successful algorithms or procedures for determining the optimum solution therefore follow a path which ultimately terminates at the optimum vertex. The speed of such algorithms depends, in part, on the number of steps and also, in part, on the complexity of each step.

One new method for solving linear programming models of physical allocation problems is called the Karmarkar algorithm, described in the article by N. K. Karmarkar entitled "A New Polynomial-Time Algorithm for Linear Programming," *Combinatorica* 4(4), pp. 373–395, 1984. Unlike the older Simplex algorithm, which proceeds on the surface of the constraint polytope from vertex to vertex, the Karmarkar algorithm beings in the interior of the constraint polytope and proceeds in radial steps to the optimum vertex. At each iteration of the Karmarkar algorithm, the polytope space is rescaled to place the current value of the allocation at the polytope center. Because of the radial nature of successive steps, far fewer steps are required to reach the optimum vertex and hence the Karmarkar algorithm presents the possibility of being much faster than the Simplex algorithm, particularly for larger-sized problems.

The canonical form of the Karmarkar algorithm limits the values of the resource allocations to the region of positive values. Many real problems, however, have more restrictive limits on the values of these allocations. For example, the ability to allocate resources is often limited by economic, political, sociological or legal considerations which have little to do with optimality, but nevertheless must be observed. The canonical Karmarkar algorithm is not well-suited for handling such arbitrary limitations which are independent of the physical constraints on the problem. Unless such limitations are introduced into the problem from the outset, the Karmarkar algorithm is unable to identify optimum allocations which take such limitations into account.

SUMMARY OF THE INVENTION

In accordance with the illustrative embodiment of the present invention, the Karmarkar algorithm is modified so as to be able to handle finite upper and lower limits on the permissible values of resource allocations. In general, the modification involves partitioning the constraint matrix and the objective function into submatrices, one submatrix consolidating all of the values dependent on the finite allocation limits, and the other submatrix representing all of the constraint-independent values.

More specifically, the modified Karmarkar algorithm which can handle finite upper and lower bounds on the allocation values includes a selection of rescaling diagonal matrices and a selection of stopping criteria between the bound-dependent and the bound-independent partitions. This approach to the incorporation of finite upper and lower bounds into the Karmarkar algorithm permits the solution of such problems with little or no increase in solution time. Since many, if not most, allocation problems have such arbitrary limits on solution values, the present invention provides a significant adjunct to the basic Karmarkar algorithm.

DETAILED DESCRIPTION

The newly available Karmarkar algorithm for making optimum resource allocations with a linear programming model will first be discussed, and thereafter the modifications of the Karmarkar algorithm necessary to permit handling finite upper and lower bounds on allocation values will be taken up.

Figure 1:
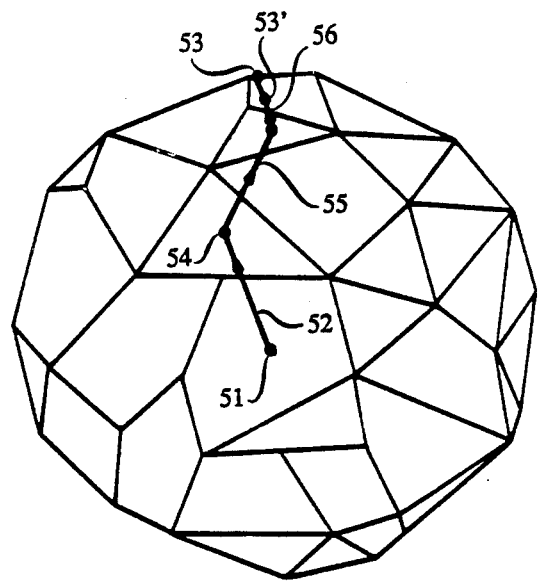
FIG. 1 is a graphical representation of the Karmarkar method for determining optimum resource allocations in linear programming models.

Before proceeding to a formal mathematical statement of the Karmarkar algorithm, a brief description of a graphical representation of the algorithm is in order. Referring more particularly to FIG. 1, there is shown a graphical representation of a convex, multidimensional polytope 50 which represents graphically the sum total of the constraints of a linear programming model. Each facet of polytope 50 in FIG. 1 is a partial plane which represents one linear constraint. The number of constraints is at least as large as the number of facets, while the number of unknown variables corresponds to the number of dimensions of the space in which polytope 50 exists. In FIG. 1, only three dimensions are represented because of the inherent limitations of human perception. The number of dimensions (variables) in practical linear programming models, however, can be hundreds, thousands and even millions.

In accordance with the Karmarkar algorithm, disclosed and claimed in the U.S. Pat. No. 4,744,028 issued to N. K. Karmarkar on May 10, 1988, and assigned to applicants' assignee, a starting point 51, located in the interior of polytope 50, is selected. As is well known, all points in the interior and on the surface of polytope 50 represent feasible solutions to the linear programming model. Also as is well known, in the absence of degeneracy, the optimum solution lies at one vertex of polytope 50, e.g., vertex 53. The Karmarkar algorithm proceeds radially, entirely in the interior of polytope 50, in steps 52, 55, 56 ... to successive points 54, et cetera, each closer to optimum point 53. Since the Karmarkar algorithm proceeds radially in the interior of polytope 50 instead of circumferentially on the surface, from vertex to vertex, as does the Simplex algorithm, the Karmarkar algorithm is inherently faster because it requires many fewer steps, particularly for larger models. The Karmarkar algorithm takes steps in the direction of the decreasing cost gradient in the polytope interior. Moreover, the Karmarkar algorithm involves rescaling the polytope space to equalize or centralize the distance of each successive point in the trajectory or path from all of the facets of polytope 50, thereby normalizing the effect of the cost gradient in all of the dimensions of the polytope.

The formal statement of a linear programming model takes the form of an objective function which is to be maximized or minimized, and a plurality of constraint relationships which expresses the physical constraints on acceptable allocations. These constraints correspond to, and represent, as accurately as possible, the actual physical constraints present in the physical system. In standard vector notation, a typical linear programming model is expressed as follows:

Minimize: $c \cdot x$ (1)
Subject To: $Ax = b$
and $x \geq 0$

Find a vector x of length n to where $c = (c_1, c_2, \ldots, c_n)$ is a vector of cost coefficients, the operation "$\cdot$" represents the vector dot product, $x = (x_1, x_2, \ldots, x_n)$ is a vector of allocation values, n is the number of such allocation values, $A = (a_{11}, a_{12}, \ldots, a_{ij}, \ldots, a_{mn})$ is an m by n matrix of constraint coefficients, and $b = (b_1, b_2, \ldots, b_m)$ is a vector of m constraint limits.

In the canonical Karmarkar form of the linear programming model, the values of the components of x (the allocation values) are constrained to be non-negative values, but other limits are possible, as will be discussed below. All objective functions and all constraint relationships can be reduced to this form by simple algebraic manipulation. "Greater than or equal to" constraints can, for example, be changed to "equality" constraints by adding artificial "surplus" variables to the constraint matrix. Similarly, "less than or equal to" constraints can be changed to "equality" constraints by adding artificial "slack" variables. These techniques are well known in the prior art.

The Karmarkar algorithm can be summarized as follows, using a highly compact vector notation. At each step of the iterative procedure, the algorithm computes a dual vector w. This vector is completely analogous to the vector of dual variables generated by the Simplex algorithm and used for sensitivity analysis. In accordance with the Karmarkar algorithm, the vector w is rescaled in accordance with the formula:

$$w = (AD_x^2 A^T)^{-1} AD_x^2 c. \quad (2)$$

The direction z of the step to the next set of allocation values is given by $$z = D_x^2(c - A^T w) \quad (3)$$

where, in equations (2) and (3), $D_x$ is the diagonal matrix of the current allocation values.

Using these values of w and z, two stopping variables can be defined:

$$\gamma = \max \frac{z_i}{x_i} \quad (4)$$

and $$\delta = -\min \frac{z_i}{x_i^2} \quad (5)$$

where "$\gamma$" is called the complementary slackness coefficient and "$\delta$" is called the dual feasibility coefficient.

If M is defined as the maximum value of the $x_i$, one heuristic stopping criteria can be defined as follows. If $$\gamma + M\delta < \frac{\epsilon}{n} (|c \cdot x| + 1), \quad (6)$$

then stop, where "$\epsilon$" is an arbitrarily small error measure and n is the number of variables x. If inequality (6) is not satisfied, a step is taken in the direction z from the current allocation x to get a new allocation, i.e., $$x \leftarrow x - \frac{\alpha}{\gamma} z \quad (7)$$

where ($0 < \alpha < 1$) is a fixed value much like that defined by Karmarkar. Using the new allocation values, the algorithm calls for returning to equation (2) and continuing the iteration until inequality (6) is satisfied. Once inequality (6) is satisfied, the primal objective value is given by (c·x) and the dual objective value is given by (w·b). If the problem requires a maximization model, then the step direction z is negative.

Figure 2:
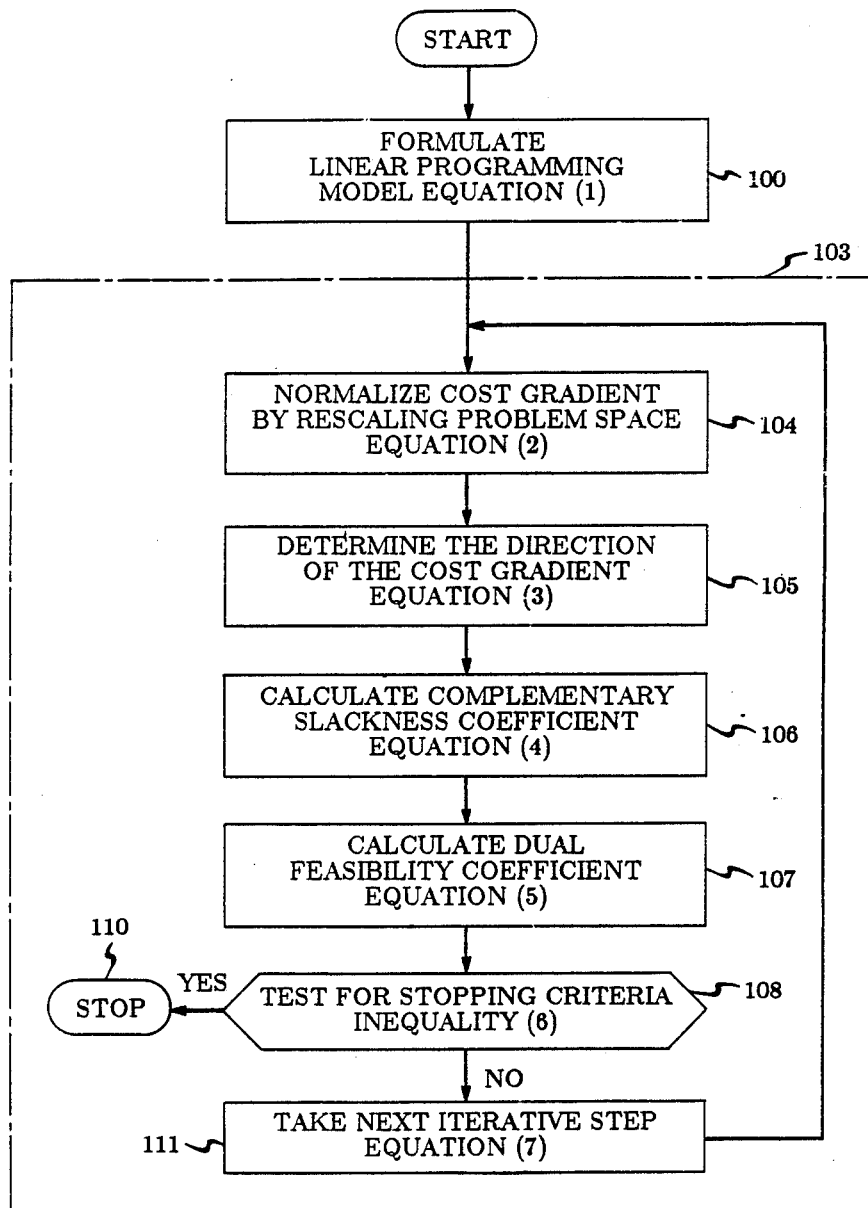
FIG. 2 is a general flowchart of the Karmarkar method for solving linear programming models.

A flowchart for the basic Karmarkar algorithm is shown in FIG. 2 of the drawings. As shown in FIG. 2, it is first necessary to formulate the linear programming model in box 100. A strictly feasible starting point x is then selected and used as the starting point for the iterative procedure in dashed box 103. Techniques for selecting the strictly feasible starting point will be discussed hereinafter. The balance of FIG. 2, contained in dashed box 103, is the iterative portion of the procedure in accordance with the Karmarkar algorithm.

Iterative procedure 103 of FIG. 2 comprises the following steps. Given a strictly feasible allocation of the components of x:

(1) In box 104, rescale the space of the polytope so as to place the dual variable w at the center of the polytope, thereby normalizing the cost gradient in all dimensions in accordance with equation (2);

(2) In box 105, calculate the direction of steepest descent of the cost (objective) function according to equation (3);

(3) In box 106, calculate the complementary slackness coefficient in accordance with equation (4);

(4) In box 107, calculate the dual feasibility coefficient in accordance with equation (5);

(5) In decision box 108, test the current values of the variables in accordance with the stopping criteria of inequality (6);

(6) If the stopping criteria is satisfied in decision box 108, terminate in box 110;

(7) If the stopping criteria is not satisfied in decision box 108, step in the direction of the negative gradient of the objective function in accordance with equation (7) in box 111, set the current allocation to the new allocation value, and reenter box 104.

In the following pages, the basic Karmarkar algorithm, described above in connection with FIG. 2, will be modified so as to handle finite upper and lower bounds on the allocations values x. First, an algorithm with be derived to handle finite upper bounds, and then that algorithm will be further modified to handle non-zero lower bounds.

In order to derive a modified version of the Karmarkar algorithm to handle finite upper bounds in accordance with the present invention, it is first necessary to restate the linear programming model so as to partition the objective function and the constraint matrix into bound-dependent and bound-independent submatrices:

$$\text{Minimize:} \begin{bmatrix} c \\ 0 \end{bmatrix} \cdot \begin{bmatrix} x \\ y \end{bmatrix} \quad (8)$$

$$\text{Subject To:} \begin{bmatrix} A & 0 \\ I & I \end{bmatrix} = \begin{bmatrix} b \\ u \end{bmatrix}$$

$$\text{and} \begin{bmatrix} x \\ y \end{bmatrix} \geq 0$$

where u represents the finite upper bound on the values of x, y represents the allocation values constrained by upper bound u, and I is the identity matrix. Making the following substitution of variables:

$$\tilde{A} = \begin{bmatrix} A & 0 \\ I & I \end{bmatrix} \quad (9)$$

$$\tilde{b} = \begin{bmatrix} b \\ u \end{bmatrix}$$

$$\tilde{c} = \begin{bmatrix} c \\ 0 \end{bmatrix}$$

$$\tilde{x} = \begin{bmatrix} x \\ y \end{bmatrix}, \text{ and}$$

$$\tilde{D} = \begin{bmatrix} D_x & 0 \\ 0 & D_y \end{bmatrix}$$

the dual vector can be expressed as $$\begin{aligned}\tilde{w} &= (\tilde{A}\tilde{D}^2\tilde{A}^T)^{-1}\tilde{A}\tilde{D}^2\tilde{c} \\ &= \begin{bmatrix} AD_x^2 A^T & AD_x^2 \\ D_x A^T & D_x^2 + D_y^2 \end{bmatrix}^{-1} \begin{bmatrix} AD_x^2 c \\ D_y^2 c \end{bmatrix} \end{aligned} \quad (10)$$

The dual vector $\tilde{w}$, in turn, can be partitioned into parts w and v, where v represents those elements of the vector $\tilde{w}$ dependent on the upper bound u:

$$w = \left( AD \frac{x^2 y^2}{x^2 + y^2} A^T \right)^{-1} AD \frac{x^2 y^2}{x^2 + y^2} c \quad (11)$$

and

-continued $$v = D \frac{x^2 y^2}{x^2 + y^2} (c - A^T w), \quad (12)$$

where the diagonal D matrices are for the stated functions of x and y.

Using the same notation, the direction of the next step inside the polytope is given by $$\bar{z} = \bar{D}^2(\bar{c} - \bar{A}^T \bar{w}) \quad (13)$$
$$= \begin{bmatrix} I \\ -I \end{bmatrix} D \frac{x^2 y^2}{z^2 + y^2} (c - A^T w).$$

Using these values of $\bar{w}$ and $\bar{z}$, the complimentary slackness coefficient is given by $$\gamma = \max\left(\frac{z_i}{x_i} \vee -\frac{z_i}{y_i}\right), \quad (14)$$

where "V" indicates the maximum of either the first or the second term.

Similarly, the dual feasibility coefficient is given by $$\delta = -\min\left(\frac{z_i}{x_i^2} \wedge -\frac{z_i}{y_i^2}\right), \quad (15)$$

where "$\wedge$" indicates the minimum of either the first or the second term.

Where x is near zero or where y is near zero, the quantity $$\frac{x^2 y^2}{x^2 + y^2} \approx (x \wedge y)^2. \quad (16)$$

Under this assumption, $(\bar{c} \cdot \bar{x} = c \cdot x)$ and $(\bar{w} \cdot \bar{b} = w \cdot b + v \cdot u = w \cdot b + D_y^{-2} z \cdot u)$.

Using the above development, the modified Karmarkar algorithm for finite upper bounds can be written as follows, letting $(y = u - x)$. The rescaled dual variable w is given by $$w = (AD_x^2 A^T)^{-1} AD_x^2 c \quad (17)$$

where $D_x = \text{diag}(x \wedge y)$. The balance of the algorithm can be summarized as follows:

$$z = D_x^2(c - A^T w) \quad (18)$$

$$\gamma = \max\left(\frac{z_i}{x_i} \vee -\frac{z_i}{y_i}\right) \quad (19)$$

$$\delta = -\min\left(\frac{z_i}{x_i^2} \wedge -\frac{z_i}{y_i^2}\right), \text{ and} \quad (20)$$

$$M = \max(x_i \wedge y_i). \quad (21)$$

If $$\gamma + M\delta < \frac{\epsilon}{n} (|c \cdot x| + 1) \quad (22)$$

then stop; the solution is then given by x. If inequality (22) is not satisfied, then $$x \leftarrow x - \frac{\alpha}{\gamma} z \quad (23)$$

and return to equation (17). Once inequality (22) is satisfied, the primal objective value is given by $(c \cdot x)$ and the dual objective value is given by $(w \cdot b + D_y^{-2} z \cdot u)$.

Figure 3:
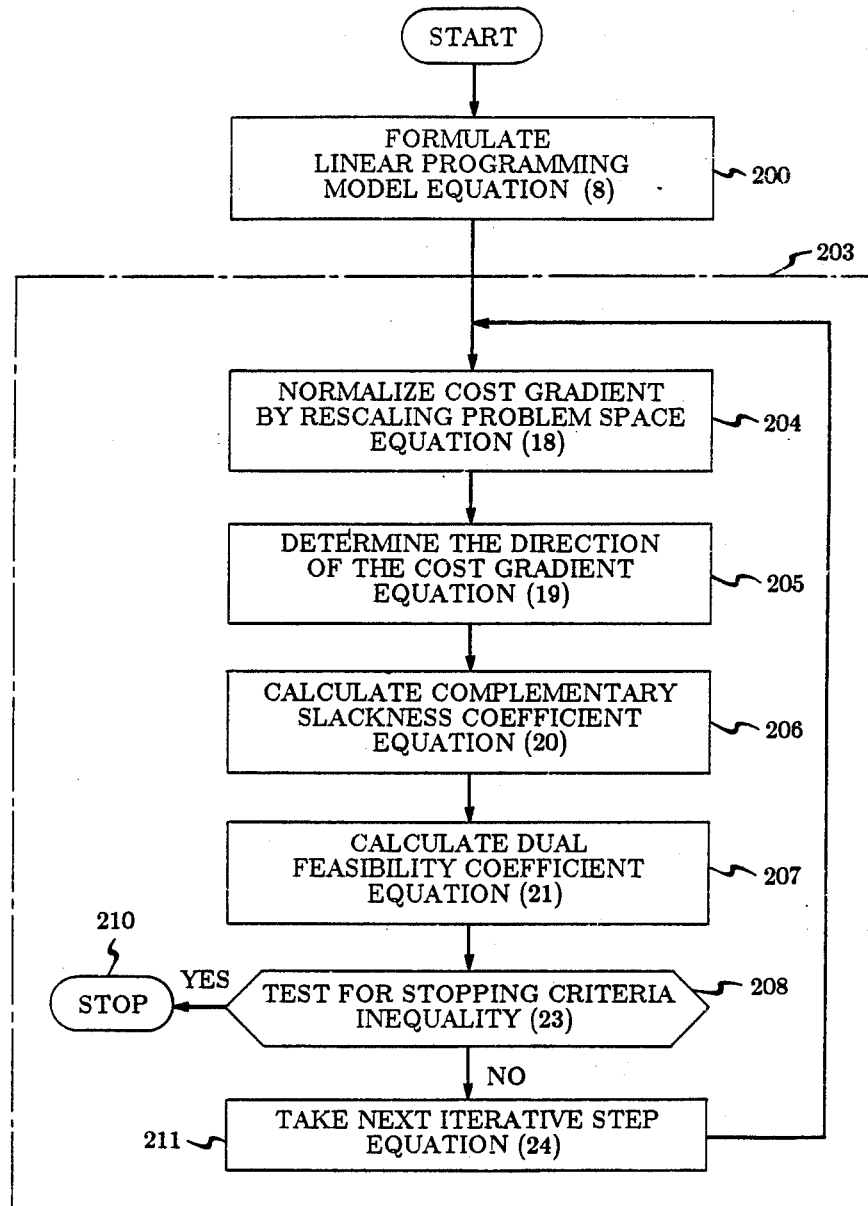
FIG. 3 is a flowchart of a modified Karmarkar algorithm modified for finite upper bounds by partitioning the problem into upper bound-dependent and upper bound-independent submatrices in accordance with the present invention.

A flowchart for this expression of the Karmarkar algorithm is shown in FIG. 3 of the drawings. As shown in FIG. 3, it is first necessary to formulate the linear programming model in box 200. A strictly feasible starting point x is then selected and used as the starting point for the iterative procedure in dashed box 203. Techniques for selecting the strictly feasible starting point are well known and are disclosed in the copending application of R. J. Vanderbei, Ser. No. 851,120, filed Apr. 11, 1986, and assigned to applicants' assignee. The balance of FIG. 3, contained in dashed box 203, is the iterative portion of the procedure in accordance with the modified Karmarkar algorithm.

Iterative procedure 203 of FIG. 3 comprises the following steps. Given a strictly feasible allocation of the components of x:

(1) In box 204, rescale the space of the polytope so as to place the dual variable w at the center of the polytope, thereby normalizing the cost gradient in all dimensions in accordance with equation (16);

(2) In box 205, calculate the direction of steepest descent of the cost (objective) function according to equation (17);

(3) In box 206, calculate the complementary slackness coefficient in accordance with equation (18);

(4) In box 207, calculate the dual feasibility coefficient in accordance with equation (19);

(5) In decision box 208, test the current values of the variables in accordance with the stopping criteria of inequality (20);

(6) If the stopping criteria is satisfied in decision box 208, terminate the entire procedure in box 210;

(7) If the stopping criteria is not satisfied in decision box 208, step in the direction of the negative gradient of the objective function in accordance with equation (22) in box 211, set the current allocation to the new allocation value, and reenter box 204.

The modified Karmarkar algorithm derived above leads to an extremely efficient methodology when finite upper bounds must be placed on the allocation values. Such bounds occur in most classes of problems where practical limitations are smaller or less than the values which would produce optimality.

Using the same approach as was used for finite upper bounds, the case of non-zero lower bounds can be accommodated as follows. The linear programming model can be expressed as follows:

Find a vector x of length n to

Minimize: $c \cdot \bar{x} + c \cdot l$ \quad (24)
Subject To: $A\bar{x} = b - Al$
and $0 \leq \bar{x} \leq (u - l)$ where u is the finite upper bound and l is the non-zero lower bound on the values of the x variables. Using the same approach used for the finite upper bound alone, the modified Karmarkar algorithm for finite upper and lower bounds can be written as follows, letting $(\bar{y} = \bar{u} - \bar{x} = u - x)$. The rescaled dual variable w is given by $$\bar{w} = (AD_{\bar{x}}^2 A^T)^{-1} AD_{\bar{x}}^2 c \tag{25}$$

where $D_x = \text{diag}(\bar{x} \Lambda \bar{y}) = \text{diag}[(x-l)\Lambda(u-x)]$. The balance of the algorithm can be summarized as follows:

$$\bar{z} = D_{\bar{x}}^2 (c - A^T \bar{w}) \tag{26}$$

$$\bar{\gamma} = \max\left(\frac{\bar{z}_i}{\bar{x}_i} \vee -\frac{\bar{z}_i}{\bar{y}_i}\right) \tag{27}$$

$$\bar{\delta} = -\min\left(\frac{\bar{z}_i}{\bar{x}_i^2} \Lambda -\frac{\bar{z}_i}{\bar{y}_i^2}\right), \text{ and} \tag{28}$$

$$M = \max(\bar{x}_i \Lambda \bar{y}_i). \tag{29}$$

$$\gamma + M\delta < \frac{\epsilon}{n}(|c \cdot x| + 1), \tag{30}$$

then stop. The solution is then given by x. If inequality (30) is not satisfied, then $$x \leftarrow x - \frac{\alpha}{\gamma} \bar{z} \tag{31}$$

and return to equation (25). Once inequality (30) is satisfied, the primal objective value is given by $(c \cdot x)$ and the dual objective value is given by $(w \cdot b + D_y^{-2} z \cdot u)$.

Figure 4:
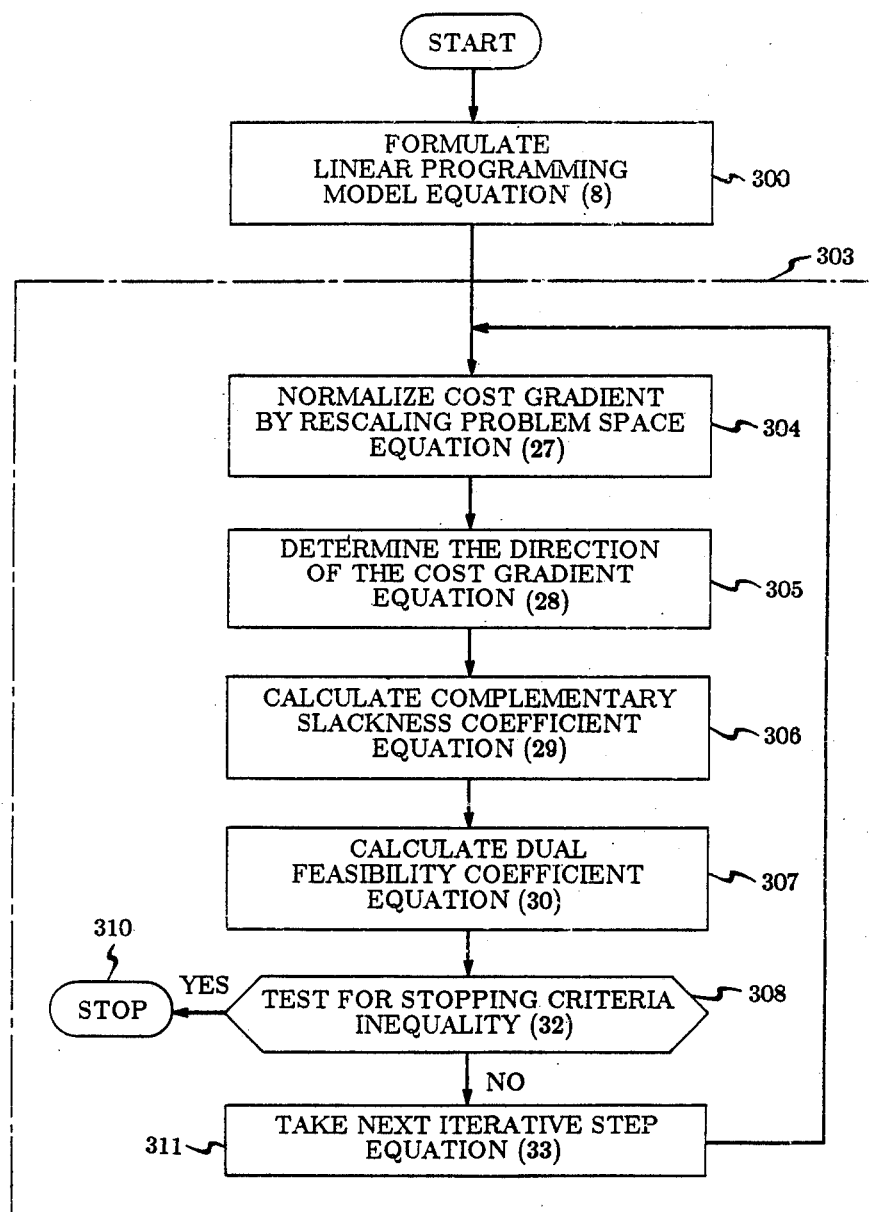
FIG. 4 is a flow chart of a modified Karmarkar algorithm modified for finite lower bounds by partitioning the problem into lower bound-dependent and bound-independent submatrices in accordance with the present invention.

A flowchart for this expression of the modified Karmarkar algorithm is shown in FIG. 4 of the drawings. As shown in FIG. 4, it is first necessary to formulate the linear programming model in box 300. A strictly feasible starting point x is then selected and used as the starting point for the iterative procedure in dashed box 303. Techniques for selecting the strictly feasible starting point are well known and are disclosed in the aforementioned copending application of R. J. Vanderbei. The balance of FIG. 4, contained in dashed box 303, is the iterative portion of the procedure in accordance with the modified Karmarkar algorithm.

Iterative procedure 303 of FIG. 4 comprises the following steps. Given a strictly feasible allocation of the components of x:

(1) In box 304, rescale the space of the polytope so as to place the dual variable w at the center of the polytope, thereby normalizing the cost gradient in all dimensions in accordance with equation (25);

(2) In box 305, calculate the direction of steepest descent of the cost (objective) function according to equation (26);

(3) In box 306, calculate the complementary slackness coefficient in accordance with equation (27);

(4) In box 307, calculate the dual feasibility coefficient in accordance with equation (28);

(5) In decision box 308, test the current values of the variables in accordance with the stopping criteria of inequality (30);

(6) If the stopping criteria is satisfied in decision box 308, terminate the entire procedure in box 310;

(7) If the stopping criteria is not satisfied in decision box 308, step in the direction of the negative gradient of the objective function in accordance with equation (31) in box 311, set the current allocation to the new allocation value, and reenter box 304.

The next step in the development of the present invention involves allowing the upper bounds to be generalized so as to permit separate and different bounds for each element of the allocation variable x. The linear programming model for this generalized bounds problem can be written as:

Minimize: $c \cdot x$ \
Subject To: $Ax = b$ \
and $Gx \leq u$ \
and $x \geq 0$ \hfill (32)

where G is a diagonal matrix of limit values for the individual elements of x. Using the same notation as before, letting $(y = u - Gx)$, the rescaled dual variable w is given by $$w = (AD^* A^T)^{-1} AD^* c \tag{33}$$

where $(D^* = D_x^2 - D_x^2 G^T D_g^{-1}(x) + y^2 G D_x^2)$. The balance of the algorithm can be summarized as follows:

$$z = D^*(c - A^T w) \tag{34}$$

$$\xi = -Gz \tag{35}$$

$$\gamma = \max\left(\frac{z_i}{x_i} \vee -\frac{z_i}{y_i}\right) \tag{36}$$

$$\delta = -\min\left(\frac{z_i}{x_i^2} \Lambda -\frac{z_i}{y_i^2}\right), \text{ and} \tag{37}$$

$$M = \max x_i. \tag{38}$$

If $$\gamma + M\delta < \frac{\epsilon}{n}(|c \cdot x| + 1) \tag{39}$$

the stop; the solution is then given by x. If inequality (39) is not satisfied, then $$x \leftarrow x - \frac{\alpha}{\gamma} z \tag{40}$$

and return to equation (33). Once inequality (39) is satisfied, the primal objective value is given by $(c \cdot x)$ and the dual objective value is given by $(w \cdot b + D_y^{-2} z \cdot u)$.

Figure 5:
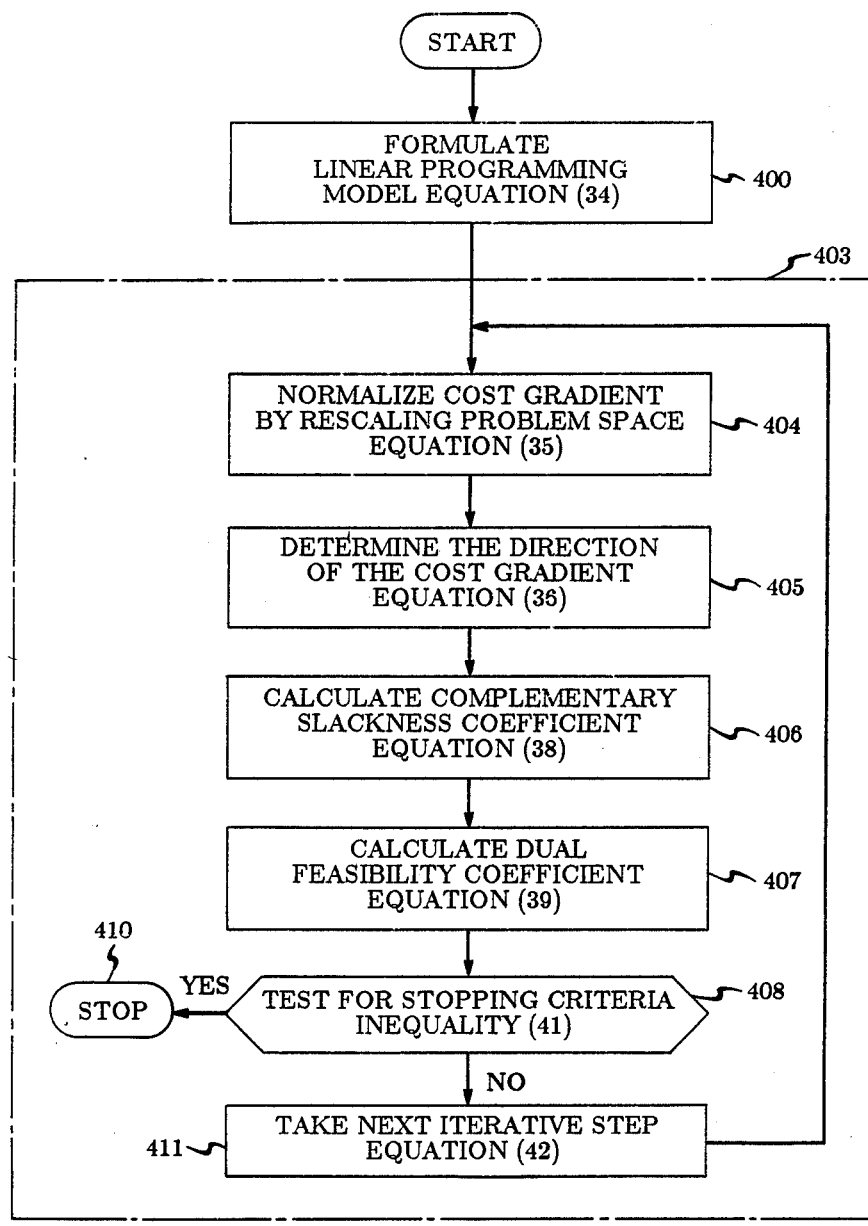
FIG. 5 is a flow chart of a modified Karmarkar algorithm modified for individual finite lower bounds on each of the allocation values in accordance with the present invention.

A flowchart for this expression of the modified Karmarkar algorithm is shown in FIG. 5 of the drawings. As shown in FIG. 5, it is first necessary to formulate the linear programming model in box 400. A strictly feasible starting point x is then selected and used as the starting point for the iterative procedure in dashed box 403. Techniques for selecting the strictly feasible starting point are well known and are disclosed in the aforementioned copending application of R. J. Vanderbei. The balance of FIG. 5, contained in dashed box 403, is the iterative portion of the procedure in accordance with the modified Karmarkar algorithm.

Iterative procedure 403 of FIG. 5 comprises the following steps. Given a strictly feasible allocation of the components of x:

(1) In box 404, rescale the space of the polytope so as to place the dual variable w at the center of the polytope, thereby normalizing the cost gradient in all dimensions in accordance with equation (33);

(2) In box 405, calculate the direction of steepest descent of the cost (objective) function according to equation (34);

(3) In box 406, calculate the complementary slackness coefficient in accordance with equation (36);

(4) In box 407, calculate the dual feasibility coefficient in accordance with equation (37);

(5) In decision box 408, test the current values of the variables in accordance with the stopping criteria of inequality (39);

(6) If the stopping criteria is satisfied in decision box 408, terminate the entire procedure in box 410;

(7) If the stopping criteria is not satisfied in decision box 408, step in the direction of the negative gradient of the objective function in accordance with equation (40) in box 411, set the current allocation to the new allocation value, and reenter box 404.

Figure 6:
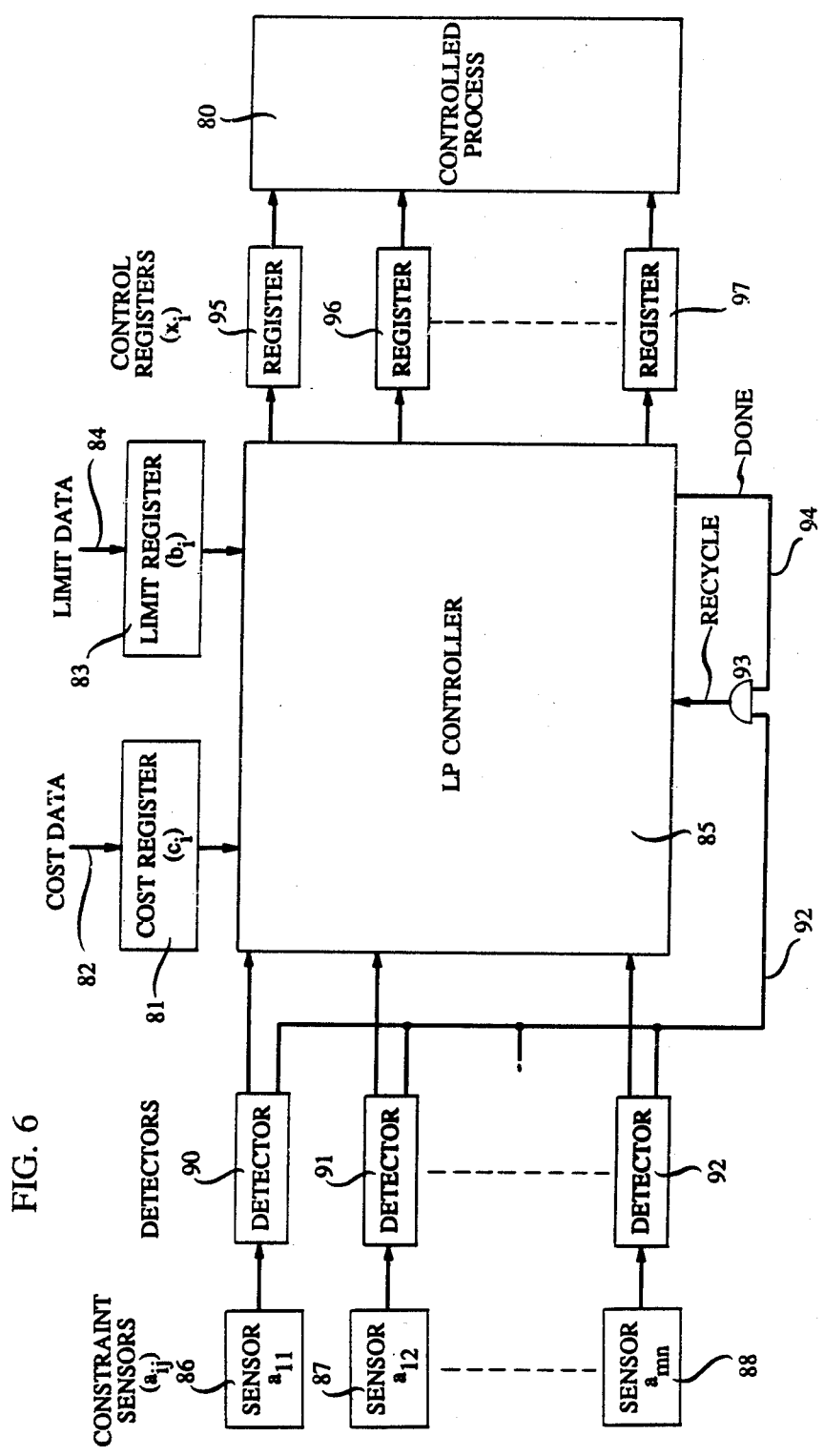
FIG. 6 is a block diagram of a resource allocation system using the methods of FIGS. 3, 4 or 5 to control resource allocations.

In FIG. 6 there is shown a process control system which controls a process 80. Process 80 may be a telephone communications system, a manufacturing process, a navigation process, or any other industrial or technological process which is to be optimized. A cost register 81 receives cost data on leads 82 representing the per unit costs of the various possible allocations of resources in controlled process 80. Cost data may be entered into register 81 from a computer terminal or from separate processes which dynamically determine these costs. While this cost data normally changes relatively slowly, there is nevertheless the ability to update this data via input leads 82 whenever necessary. If there are non-zero limits on the solution values, these limits, like the cost data, must be provided to LP controller 85 by way of a data input register like register 81.

Similarly, a limit register 83 is provided to store a representation of the total physical limits on each specific resource allocation. These limits are likewise relatively static and can be entered via leads 84 into register 83 from a computer terminal or from a separate limit-determining process. The outputs of registers 81 and 83 are applied to a linear programming (LP) controller 85 which carries out the process summarized in the flowchart of FIGS. 3, 4 or 5. LP controller 85 is, in the preferred embodiment, a programmed digital computer having stored therein the program which implements the flowchart of FIGS. 3, 4 or 5. Controller 85 may also comprise a complex of hardwired circuits designed to carry out the procedures of FIGS. 3, 4 or 5, a plurality of parallel processors to take advantage of the possibilities for parallel execution of the procedure, or a plurality of programmed linear arrays programmed for this purpose.

A plurality of constraint sensors 86, 87, ..., 88 is provided to dynamically sense the constraint coefficients for the constant relationships. Constraint sensors 86–88 are continually responsive to changes in the environment of controller process 80, which changes affect the constraint relationships and hence, must be tracked in order to control process 80. Each of constraint sensors 86–88 has a corresponding change (delta) detector 89, 90, ..., 91 which senses changes in the output of each of the respective sensors 86–88. A change-indicating signal from each of detectors 89–91 is applied to change bus 92 and thence to AND gate 93. Also applied to AND gate 93 is a signal from LP controller 85 on lead 94 indicating the termination of the execution of the procedure. The outputs from sensors 86–88 are applied through detectors 89–91, respectively, to controller 85.

In operation, the outputs of sensors 86–88 are used by controller 85 as the coefficients of the constraint matrix A of equation (8). The cost data in register 81 are used as the cost vector (c) in equation (8) and the limit data in register 83 are used as the limit vector (b) of equation (8). Given these inputs, LP controller 85 is able to carry out the procedure of FIGS. 3, 4 or 5 and provide digital solution values (x's) to control registers 95, 96, ..., 97. The values in registers 95–97 are then used to control process 80.

Since LP controller 85 of FIG. 6 utilizes the extremely rapid procedures of FIGS. 3, 4 or 5 control values are available for registers 95–97 in a very short time. Moreover, as the constraints change, these changes are sensed by sensors 86–88, detected by detectors 89–91, and used to partially enable AND gate 93. When the procedure of FIGS. 3, 4 or 5 is complete, LP controller 85 generates control signals and transfers them to registers 95–97 and, simultaneously, generates an enabling signal on lead 94 to AND gate 93, completing the enablement of AND gate 93. The entire process is then repeated.

Depending on the complexity of the problem (the number of constraints sensed by sensors 86–88) and the stability of process 80, it is possible to more or less continually control process 80 by this method. Indeed, if the rate of change of the environmental factors sensed by sensors 86–88 is equal to or less than the rate of operation of LP controller 85, the process 80 will be controlled continuously. Higher rates of changes in the environment will introduce granularity into the control process, but will still permit near optimum operation, on the average, of the process 80. Indeed, given some history of the environmental changes, some predictive mechanism can be built into detectors 89–91 to predict the direction and magnitude of future changes in the outputs of sensors 86–88.

A typical type of problem in the telecommunications field to which the present invention can be applied is described in two articles in *The Bell System Technical Journal*, Vol. 60, No. 8, Oct. 1981. A first article entitled "Design and Optimization of Networks with Dynamic Routing" by G. R. Ash et al. (p. 1787) describes the general telephone traffic routing problem while the second article, entitled "Servicing and Real-Time Control of Networks with Dynamic Routing," also by G. R. Ash et al. (p. 1821) describes an auxiliary problem of minimizing idle capacity due to erroneous predictions of traffic loads.

Other problems which would benefit from the new procedures herein described include industrial process control, deployment of personnel to provide customer services, blending of ingredients to form commercial products, oil refinery product mix, assignments of computer resources to a plurality of users, and many others. In each case, the cost (or benefit) coefficients must be measured or otherwise determined, the constraint limits must be established and the contributions of all of the decision variables to these constraints also measured or determined. The result of executing the procedures is, in each case, the specification of a set of control parameters which, when applied to the real world situation, will produce an optimum process or apparatus.

It should be noted that the matrices involved in most practical linear programming models are sparse matrices and that many known sparse matrix techniques can also be used in evaluating the search direction z in FIGS. 3, 4 or 5.

While the present inventor has constructed significant improvements on the Karmarkar method for solving linear programming models, it is to be understood that the claims of this invention relate only to the application of these novel improvements to arrangements that determine the optimum allocation of resources in real world technological and industrial systems that lend themselves to a linear representation of the variables and constraints characterizing the system, i.e., physical arrangements that determine how resources are actually applied to optimize the performance of processes, machines, manufactures or compositions of matter. All other uses of the new method, such as computation research, algorithm research, or linear algebra research activities, form no part of the present invention. Similarly, use of the new method in non-technological or non-industrial systems likewise forms no part of the present invention.

What is claimed is:

1. A method for allocating available industrial facilities among the users of said facilities so as to minimize the total cost of providing said facilities, said method comprising the steps of:

tentatively and iteratively reassigning said available facilities to said users in accordance with a deterministic process so as to reduce said total costs at each said reassignment with each of the reassignments in said tentatively and iteratively reassigning being characterized by a total cost that is lower than the cost of preceding reassignment, terminating said iterative reassigning steps when said costs are minimized, and physically allocating said facilities in accordance with the minimum cost assignment wherein said deterministic process is the Karmarkar algorithm where each reassignment is developed by normalizing the previous reassignment with respect to constraints on said allocations, and the direction of changes in said previous reassignment to develop said each reassignment is made under the constraint that at least one of said assignments has a finite limit.

2. The allocation method according to claim 1 wherein all of said reassignments have the same finite limit.

3. The allocation method according to claim 1 wherein each of said reassignments has its own respectively different limit.

4. An optimized resource allocation system comprising:

a first plurality of physical resources available for use, a second plurality of resource users keyblue to said physical resources so as to minimize the cost of providing said resources, said assigning means including means for iteratively and tentatively selecting feasible ones of said assignments such that, at each iteration, each of said feasible assignments is centered within the interior of a normalized multidimensional convex feasible solution space, said iterative selecting means further comprising means for including the effect on successive selections of limiting the value of at least one of said allocations to a preselected finite value, and means coupled to said resource users and to said iteratively selecting means for physically allocating said physical resources in accordance with the final one of said tentative assignments.

5. A system for optimizing the performance of a controlled process in accordance with an optimizing criterion, said system comprising:

process control devices for controlling said process in response to control signal sets, a plurality of sensors for sensing variable conditions affecting the operation of said process, a plurality of data input devices for prescribing conditions affecting the operation of said process, and a linear programming controller responsive to said sensors and said input devices for providing optimum control signal sets to said process control devices in accordance with the Karmarkar algorithm, said controller including means for iteratively identifying successive tentative strictly feasible control signal sets including means for limiting at least one of said control signals to a preselected value, and selecting each next tentative control signal set along the steepest gradient of a normalized version of said optimizing criteria.

6. In a system that includes industrial or technological resources to be allocated among a plurality of resource users, and a controller coupled to said users and to said resources, where the controller carries out a method for allocating said resources $x_i(i=1,n)$ among said plurality of resource users subject to constraints $$\sum_j A_{ij}x_j \leqq b_i$$

and $x_j \geqq 0 (i=1,m; j=1,n)$ in such a manner as to optimize a cost function $\Sigma c_i \cdot X_i$, said method comprising the steps of:

(a) partitioning said constraints into limit-dependent and limitindependent subsets, respectively, (b) selecting an initial allocation x meeting said constraints, (c) rescaling the space of said constraints in accordance with the formula $$w=(AD_x^2A^T)^{-1}AD_x^2c$$

where $D_x$ is the diagonal matrix of the current allocation values of x, (d) determining the direction of the next iteration of an iterative procedure for approximating said optimal cost in accordance with the formula $$z=D_x^2(c-A^Tw),$$

(e) determining the complementary slackness coefficient "$\gamma$" of said current iteration from the formula $$\gamma = \max\left(\frac{z_i}{x_i} V - \frac{zl_i}{y_i}\right),$$

wherein "V" indicates the selection of the largest maximum of the two sets, (f) determining the dual feasibility coefficient "$\delta$" of said current iteration from the formula $$\delta = -\min\left(\frac{z_i}{x_i^2} \wedge \frac{-z_i}{y_i^2}\right),$$

where "$\wedge$" indicates the selection of the smallest minimum of the two sets, (g) testing said current iteration with the equality $$\gamma + M\delta < \frac{\epsilon}{n}(c \cdot x + 1),$$

-continued where $M = \max(x_i \wedge y_i)$ and $\epsilon$ = an arbitrarily small error measure, (h) if the test of step (g) is not satisfied, returning to step (c) with the new allocations $$x \leftarrow x - \frac{\alpha}{\gamma} z.$$

where $0 \leq \alpha \leq 1$, (i) if the test of step (g) is satisfied, physically allocating said resources in accordance with said current allocation iteration values.

* * * * *